United States Patent [19]

Tanaka et al.

[11] Patent Number: 5,109,028
[45] Date of Patent: Apr. 28, 1992

[54] CATION EXCHANGE FIBERS

[75] Inventors: Koji Tanaka, Okayama; Hiroshi Ohno, Hiroshima; Tomomi Takahashi, Okayama, all of Japan

[73] Assignee: Japan Exlan Company Limited, Osaka, Japan

[21] Appl. No.: 312,054

[22] Filed: Feb. 17, 1989

[30] Foreign Application Priority Data

Mar. 14, 1988 [JP] Japan .................. 63-61700

[51] Int. Cl.$^5$ .................................. C08F 20/44
[52] U.S. Cl. ............................ 521/32; 521/28; 521/30; 521/31
[58] Field of Search ............ 521/32, 30, 31, 28

[56] References Cited

U.S. PATENT DOCUMENTS

| 3,233,026 | 2/1966 | Richter ........................ 521/32 |
| 4,523,336 | 1/1969 | Bufton et al. .................. 521/32 |

FOREIGN PATENT DOCUMENTS

| 0194766 | 9/1986 | European Pat. Off. ....... 521/32 |
| 54-38596 | 11/1979 | Japan . |

OTHER PUBLICATIONS

Kogyo Kogaku Zassshi 68, 1304–1306, 1965.

Primary Examiner—Thurman K. Page
Assistant Examiner—P. Kulkosky
Attorney, Agent, or Firm—Wenderoth, Lind & Ponack

[57] ABSTRACT

The present invention provides cation exchange fibers having a high capacity of ion exchange and a high utilization rate of ion exchange radicals. The fibers are produced so as to have 3 m eq/g or more of carboxyl groups introduced by simultaneous crosslinking and hydrolyzing treatments of acrylic fibers, and to have tensile strength 1 g/d or more and a degree of water-swellability less than 100%, while maintaining fiber properties without problems in practical use.

6 Claims, No Drawings

CATION EXCHANGE FIBERS

BACKGROUND OF THE INVENTION

1. Field of the Invention

The present invention relates to cation exchange fibers having a high capacity of ion exchange and a low degree of swellability as well as physical properties which allow them to withstand processing such as in a carding operation.

2. Description of the Prior Art

Ion exchange resins have been used since old times in a variety of fields including treatment for civil water, waste water, toxic gases, and others.

As regards the shape of the resin, fibers are preferable to grains since the former has a larger surface area than the latter and therefore can increase the ion exchange speed. Moreover, fiber shape is more advantageous in industrial use since fibers are freer in use shape. Up to this time therefore many attempts have been made on ion exchange fibers.

For example, in KOGYO KAGAKU ZASSHI, 68 (7) 1304 (1965), it is described that excellent cation exchange fibers can be obtained by introducing carboxyl groups into acrylonitrile (hereinafter referred to as AN) polymer fibers by hydrolyzing nitrile groups of the AN polymer fibers.

By this method, however, with an increase in the ion exchange capacity, fiber physical properties such as tensile strength, etc. will fall, and for example, when carboxyl groups of more than 3 m eq/g are introduced, such fibers, though they hold fiber shape, can not retain physical properties which allow them to withstand processing such as in a carding operation.

In Japanese Patent Publication No. 38596/1979, a method of producing cation exchange fibers is proposed wherein AN polymer fibers are reacted with hydrazine to give a prescribed anion exchange capacity, followed by hydrolysis of remaining nitrile groups.

By this method, however, with an increase in the ion exchange capacity, the fiber physical properties also fall greatly and moreover since the degree of swellability increases extremely, there will occur problems of clogging and deterioration upon use. Consequently, even though the ion exchange capacity may be heightened, the rate of its utilization has to be low, and finally, such ion exchange fibers fail in displaying a high ion exchange ability.

The object of the present invention is therefore to provide cation exchange fibers which have no such problems as mentioned above that have become apparent from various experiments, and which are given a high ion exchange capacity and a high utilization rate of ion exchange radicals while retaining fiber physical properties without problems in practical use, with the degree of water-swellability of which being controlled to below a definite level, thereby to fully display advantages of the high ion exchange speed, free shape, etc. coming from the fiber's own intrinsic nature.

SUMMARY OF THE INVENTION

The above-mentioned object of the present invention is attained by cation exchange fibers having 3 m eq/g or more of carboxyl groups introduced into AN fibers by simultaneous crosslinking and hydrolyzing treatments of said AN fibers, and having a tensile strength of 1 g/d or more and a degree of water-swellability of less than 100%.

DETAILED DESCRIPTION OF THE INVENTION

In the following, the present invention will be explained in more detail.

First, as the AN polymer to form the acrylic fibers used as the starting fibers, it is desirable to use polymers containing 40 weight % or more, preferably 50 weight % or more of AN, the use of AN homopolymers being also desirable. As the comonomers, there may be mentioned vinyl halides and vinylidene halides such as vinyl chloride, vinyl bromide, vinylidene chloride, etc.; ethylenically unsaturated carboxylic acids such as acrylic acid, methacrylic acid, maleic acid, itaconic acid, etc., and salts thereof; (meth)acrylic acid esters such as ethyl (meth)acrylate, butyl (meth)acrylate, etc.; vinyl esters such as vinyl acetate, vinyl propionate, etc.; ethylenically unsaturated sulfonic acids such as vinylsulfonic acid, (meth)allylsulfonic acid, p-styrenesulfonic acid, etc. and salts thereof; vinyl compounds such as (meth)acrylamide, vinylidene cyanide, methacrylonitrile, etc. Among others, ethylenically unsaturated carboxylic acids and salts thereof, and (meth)acrylic acid esters, ethylenically unsaturated sulfonic acids and salts thereof are desirable as viewed from their hydrolysis-accelerating effects and from the exchange capacity of the cations to be introduced, and vinyl esters are desirable as viewed from a good balance of their practical efficiency and ability for ion exchange.

In respect of the fiber diameters, those as fine as possible are favorable as viewed from the surface area (or ion exchange speed), but a diameter generally from 3 to $100\mu$, preferably from 5 to $50\mu$ is recommended in consideration of a good balance with fiber physical properties. As for the cross-sectional shape of the fibers, any shape may be used, without being limited to circular, flat, triangular, etc. shapes, and as for forms which the fibers may take, any can be used such as short fibers, long fibers, yarns, non-woven fabrics, woven or knitted fabrics, etc.

In order to produce the desired cation exchange fibers using said AN fibers as the starting fibers, it is necessary to subject the fibers to simultaneous crosslinking and hydrolyzing treatments. In the present invention, although it is essential that the crosslinking treatment and the hydrolyzing treatment should be performed at the same time, the crosslinking agents to be used may be those that are known, such as formalin, hydrazine, hydroxylamine, etc. The hydrolyzing treatment may be performed either with acid or alkali, but the following method is recommended for industrial advantages in producing the desired cation exchange fibers:

An aqueous solution containing hydrazine and an alkali metal hydroxide is fixed to the starting AN fibers so that the quantity of the alkali metal hydroxide (calculated as NaOH) will be in the range of 10–50%, preferably 15–45%, and the quantity of hydrazine (calculated as net weight of $N_2H_4$) will be in the range of 1–10%, preferably 1.5–9% based on the dry weight of the fibers. The fibers are then heated at a temperature above 80° C. for 5–120 minutes, preferably at a temperature between 100° and 150° C. in a wet-heated atmosphere for 10 to 80 minutes. Incidentally, water is preferred industrially as the solvent for preparing the aqueous solution, but it is also possible to use a mixed solvent made of water and a water-miscible organic solvent such as alcohol, acetone, dimethylformamide, etc.

Thus, it is possible to provide cation exchange fibers having carboxyl groups introduced into the outer layer part of the starting AN fibers in a quantity of 3 m eq/g or more, desirably 3.5 m eq/g or more, more desirably 4 m eq/g or more, and having a tensile strength of 1 g/d or more, desirably 1.5 g/d or more, more desirably 2 g/d or more, and an elongation of 15-60%, a degree of water-swellability less than 100%, desirably less than 90%, more desirably less than 80%, and a degree of aqueous ammonia-swellability of less than 500%, desirably less than 400%. Incidentally, the quantity of carboxyl groups (cation exchange capacity) was determined as follows: About 0.5 g of dry H-type cation exchange fibers was weighed accurately, and was immersed in 40 ml of an aqueous 0.1N caustic soda solution at 25° C. for 24 hours. Ten ml of the supernatant or filtrate was collected accurately, and was back-titrated with an aqueous 0.1N hydrochloric acid solution to determine the consumed quantity of the caustic soda solution. The degree of water-swellability was determined as follows: About 0.4 g of H-type cation exchange fibers was immersed in 300 ml pure water at 25° C. for 30 minutes and was then dehydrated by a centrifuge at 300 G (G is the acceleration of gravity) for 3 minutes. The thus-prepared sample was measured for its weight ($W_1$ g). The sample was then dried in a vacuum drier until it reached a constant weight ($W_2$ g). The degree of water-swellability was calculated by the following formula:

$$\text{Degree of water-swellability} = \frac{W_1 - W_2}{W_2} \times 100$$

The degree of aqueous ammonia-swellability was determined in the same way except that 2 ml of aqueous ammonia of a 28 weight % concentration was added to 300 ml pure water.

In order to remedy the deterioration and clogging upon use and in consideration of processability such as that in a carding operation, it is desirable to use crimped fibers as the starting fibers to finally form cation exchange fibers having crimping characteristics such as a number of crimps of 5-15 per 25 mm and a percentage crimp of 5-25%.

In order to provide cation exchange fibers of the present invention which simultaneously satisfy the antinomic subjects—the introduction of a high ion exchange capacity as opposed to the retention of fiber physical properties without problems in practical use, with the water-swellability being suppressed as low as possible—, it is desirable to adopt starting AN fibers which have the following characteristics in particular:

That is to say, it is desirable to adopt acrylic fibers whose AN polymer molecules forming the fibers are sufficiently oriented, and Congo Red (hereinafter referred to as CR) dichroic ratio is above 0.4, desirably above 0.5. Incidentally, the CR dichroic ratio was determined by the method described in KOBUNSHI KAGAKU, 23 (252) 193 (1966).

The method of producing such acrylic fibers is not limited, and as far as the above-mentioned CR dichroic ratio is satisfied, any known method may be suitably adopted. Among others, by adopting a method wherein the total draw ratio is set to 6 times or more, desirably 8 times or more, and the process shrinkage is set to less than 30%, desirably less than 20%, the desired acrylic fibers can be produced with industrial advantage.

When short fibers are used as the starting fibers, the obtained cation exchange fibers can be suitably processed into yarns, non-woven fabrics, knitted or woven fabrics, etc., according to the final shape of use. In order to continuously conduct an operation in which one cycle is formed of ion exchange, washing, regeneration, and washing, and when the fibers are used in the form of a continuous belt for example, dimensional stability is particularly necessary. In such use, a non-woven fabric composed of the cation exchange fibers of the present invention and heat-bondable fibers (desirably with a blend percentage of 10-80%) is recommended. As heat-bondable fibers, any fibers may be used as far as they have heat-bonding properties. As such fibers, there may be mentioned fibers of which the low-melting point component and the high-melting point component are, respectively, polyethylene (PE) and polypropylene (PP), PE and polyester (PES), PES and PES, etc.

The thus-obtained cation exchange fibers of the present invention retain fiber properties without problems in practical use, and the water-swellability is suppressed to below a definite level. The fibers can display the advantages of high ion exchange speed, freedom in shape, etc. intrinsic to the fibers. Since the fibers do not cause clogging, deterioration, etc. upon use, the fibers can display a high ion exchange ability (a high ion exchange capacity and a high utilization rate thereof). The provision of such fibers is the effect worthy of special mention of the present invention.

Such cation exchange fibers are used in arbitrary form widely in various fields including the production of ultra-pure water, treatment of water for use in nuclear electric power generation and its waste water, water softening, removal of basic gases such as ammonia, trimethylamine, etc., electrode plates for lead storage batteries, capture of mutation-genetic substances in air, pretreatment of liquids for diagnoses, etc.

EXAMPLES OF THE PRACTICE OF THE INVENTION

In the following, the invention will be explained in detail by way of examples, wherein parts and percentages are by weight unless otherwise indicated.

EXAMPLE 1

A spinning solution was produced by dissolving 10 parts of an AN polymer (having an intrinsic viscosity [$\eta$] of 1.2 measured in dimethylformamide at 30° C.) composed of 90% AN and 10% methyl acrylate (hereinafter referred to as MA) in 90 parts of an aqueous 48% sodium thiocyanate solution. In the usual way, the spinning solution was spun into filaments and the filaments were drawn to a total draw ratio of 10 times. The filaments were then dried in an atmosphere of dry-bulb/wet-bulb of 120° C./60° C. (process shrinkage: 14%) and were given mechanical crimps. Thereafter the filaments were cut into 51 mm lengths to obtain Starting Fiber 1 having a CR dichroic ratio of 0.58.

After fixing an aqueous solution containing 25% caustic soda and 5% hydrazine to the the Starting Fiber 1 in a quantity of 100%, the fiber was treated in steam of 110° C. for 30 minutes to obtain Fiber I (fiber diameter: 19μ).

Various characteristics of Fiber I and the Starting Fiber 1 were evaluated and the results are shown in Table 1.

TABLE 1

|  | Fiber I | Starting Fiber 1 (for reference) |
|---|---|---|
| Number of crimps per 25 mm | 9.0 | 9.0 |
| Percentage crimp (%) | 9.6 | 10.0 |
| Tensile strength (g/d) | 2.2 | 4.5 |
| Elongation (%) | 25 | 25 |
| Carboxyl groups (m eq/g) | 4.1 | |
| Degree of water-swellability (%) | 50 | |
| Degree of aqueous ammonia-swellability (%) | 250 | |

As apparent from Table 1, Fiber I according to the present invention has an excellent ion exchange ability while retaining fiber characteristics without problems in practical use.

On the other hand, the Starting Fiber 1 was treated in an aqueous 3% hydrazine solution at 100° C. for 3 hours, and thereafter it was boiled in an aqueous 5% or 25% caustic soda solution. In both cases, Fiber 1 could hardly retain fiber form.

EXAMPLE 2

Starting Fiber 2 (process shrinkage: 16%; CR dichroic ratio: 0.56) was obtained in the same way as in Example 1 except that vinyl acetate was used instead of MA. Then following the same method as in Example 1, Sample Fiber II (fiber diameter: 19.5μ) was produced.

The results of evaluation of various characteristics are shown in Table 2.

TABLE 2

| Fiber No. | Tensile strength (g/d) | Elongation (%) | Carboxyl groups (m eq/g) | Swellability (%) Water | Ammonia |
|---|---|---|---|---|---|
| II | 2.6 | 29 | 4.0 | 50 | 230 |

It is seen from Table 2 that cation exchange fibers having excellent characteristics as a whole can be provided by the present invention.

EXAMPLE 3

Seven kinds of Fibers III-IX were produced in the same way as in Example 2 except that the fixed quantities (as net weight) of caustic soda or hydrazine were changed as shown in Table 3.

The results of evaluation are shown in Table 3 together.

TABLE 3

| | Fiber No. | | | | | | |
|---|---|---|---|---|---|---|---|
| | III | IV | V | VI | VII | VIII | IX |
| Fixed quantities of: | | | | | | | |
| Caustic soda (%) | 20 | 30 | 40 | 25 | 25 | 25 | 25 |
| Hydrazine (%) | 5 | 5 | 5 | 2 | 3 | 7 | 9 |
| Tensile strength (g/d) | 2.8 | 2.4 | 1.1 | 2.3 | 2.4 | 2.5 | 2.5 |
| Elongation (%) | 34 | 27 | 15 | 34 | 30 | 23 | 22 |
| Carboxyl groups (m eq/g) | 3.2 | 4.7 | 5.8* | 4.5 | 4.3 | 4.0 | 3.8 |
| Water-swellability (%) | 50 | 50 | 60 | 60 | 50 | 50 | 50 |
| Aqueous ammonia-swellability (%) | 210 | 300 | 380 | 390 | 340 | 210 | 200 |

It is seen from Table 3 that, by changing the fixed quantities of caustic soda or hydrazine, it is possible to produce fibers having the desired ion exchange quantity, swellability and fiber properties.

EXAMPLE 4

Four kinds of Fibers X-XIII were produced in the same way as in Example 1 except that Starting Fiber 1, after drying, was subjected to relaxing heat treatment in steam of 130° C. and the process shrinkage was changed as shown in Table 4.

The results of evaluation are shown in Table 4 together.

TABLE 4

| | Fiber No. | | | |
|---|---|---|---|---|
| | X | XI | XII | XIII |
| Process shrinkage (%) | 20 | 25 | 30 | 35 |
| CR dichroic ratio | 0.51 | 0.45 | 0.4 | 0.32 |
| Tensile strength (g/d) | 2.0 | 1.6 | 1.0 | Measurement impossible |
| Elongation (%) | 22 | 19 | 16 | Measurement impossible |
| Carboxyl groups (m eq/g) | 4.2 | 4.3 | 4.4 | 4.4 |
| Water-swellability (%) | 50 | 50 | 60 | 70 |
| Aqueous ammonia-swellability (%) | 290 | 420 | 490 | 800 |

It is seen from the above Table that, by controlling the CR dichroic ratio, it is possible to introduce a high ion exchange quantity without impairing the fiber physical properties.

EXAMPLE 5

A web of 200 g/m$^2$ was formed by carding Fiber I produced in Example 1 and heat-bondable fibers (low density PE:crystalline PP=1:1; single filament denier: 3 d; fiber length: 51 mm) in the ratio of 50% to 50%, and the web was heat treated at 145° C. for 10 minutes to produce a non-woven fabric.

In the production of the non-woven fabric, there was no problem in the carding operation. The non-woven fabric had a tensile strength of 22.4 kg (as measured according to JIS 8113), a water-swellability of 20%, an aqueous ammonia-swellability of 100%, and also had a good dimensional stability.

What is claimed is:

1. Cation exchange fibers, comprising:
   acrylic fibers having 3 m eq/g or more of carboxyl groups introduced into said acrylic fibers by simultaneous crosslinking and hydrolyzing treatments of said acrylic fibers, a tensile strength of 1 g/d or more, and a degree of water-swellability of less than 100%,
   said cation exchange fibers being produced by fixing to said acrylic fibers an aqueous solution containing hydrazine and an alkali metal hydroxide so that said alkali metal hydroxide will be in a range of from 10 to 50% and said hydrazine will be in a range of from 1 to 10% based on the dry weight of said acrylic fibers, and heating said acrylic fibers at a temperature above 80° C. for 5 to 120 minutes, wherein said acrylic fibers have a Congo Red dichroic ratio of 0.4 or more.

2. The cation exchange fibers as claimed in claim 1 wherein the acrylic fibers are produced from a polymer containing 40 weight % or more of acrylonitrile.

3. The cation exchange fibers as claimed in claim 1 wherein the fiber diameter is in the range of from 3 to 100μ.

4. The cation exchange fibers as claimed in claim 1 wherein the fibers have a number of crimps of from 5 to 15 per 25 mm and a percentage crimp of from 5 to 25%.

5. A cation exchange non-woven fabric composed of the cation exchange fibers as claimed in claim 1 and heat-bondable fibers.

6. The cation exchange non-woven fabric as claimed in claim 5 wherein the mixing ratio of the heat-bondable fibers is from 10 to 80%.

* * * * *